April 29, 1952  F. H. HUGHES ET AL  2,595,077
METHOD AND MACHINE FOR MANUFACTURING AMPOULES
Filed June 17, 1948  7 Sheets-Sheet 4

April 29, 1952 F. H. HUGHES ET AL 2,595,077
METHOD AND MACHINE FOR MANUFACTURING AMPOULES
Filed June 17, 1948 7 Sheets-Sheet 6

Inventors:
Floyd H. Hughes
Gregory J. Murray
BY
Attorney.

Patented Apr. 29, 1952

2,595,077

UNITED STATES PATENT OFFICE 2,595,077

METHOD AND MACHINE FOR MANUFACTURING AMPOULES

Floyd H. Hughes, Union, and Gregory J. Murray, Belleville, N. J., assignors to Hughes-Murray, Inc., Newark, N. J., a corporation of New Jersey Application June 17, 1948, Serial No. 33,514

9 Claims. (Cl. 49—1)

This invention relates in general to the manufacture of glass containers or vials, and particularly pharmaceutical vials commonly called ampules, from glass-tube stock.

One object of the invention is to provide a novel and improved method and machine of this character wherein all of the glass of which the container, which, for simplicity, will hereinafter be called ampule, is formed shall have passed through a molten state during the manufacture of the ampule, whereby the possibility of loose glass particles in the completed ampule shall be reduced to the minimum.

Further objects are to provide such a method and machine whereby uniformity in all physical dimensions of the bodies of the ampules shall be ensured; and thus to form the body of the ampule by a molding operation, as compared with the prior art method of utilizing a preformed section of a glass tube as the body of the ampule.

Another object is to provide a method and machine whereby a complete ampule, that is, an ampule having a body and neck the end or mouth of which is glazed, may be produced in one continuous operation.

Other objects, advantages and results of the invention will be brought out by the following description in conjunction with the accompanying drawings, in which.

In accordance with the invention, a glass tube is moved step by step past a plurality of stations at each of which an operation is performed on the tube in the manufacture of an ampule. At one station, the tube is fed a predetermined length for the production of one ampule, at the second station said length of tube is preliminarily heated, which heating is continued at the third station to produce a molten state, whereupon at the fourth station a molten portion is enclosed within a mold whose cavity is formed correspondingly to the desired shape of the body of the ampule, and at the same time air is injected into the tube to expand the molten glass into contact with the walls of the mold cavity. At the fifth station, the tube is heated again above the body of the ampule, and at the sixth station the body of the ampule is gripped in a stretching device that is actuated to stretch the tube to form the neck of the ampule, whereupon at the seventh station the hot neck portion of the ampule is subjected to a jet of cool air, after which the neck portion is scored and the ampule is broken off from the tube and its rim or mouth is glazed to complete the ampule.

The machine for carrying out these operations is shown as comprising eight holders or chucks A for glass tubes 1 that are equidistantly spaced about a vertical central axis on a turntable or turret B which is rotatably mounted on a co-axial vertical hollow stub shaft 2 that is journaled in a pedestal bearing E and projects upwardly from the top of a frame C which is supported on legs 3. This turret is rotated step by step in any suitable manner, preferably by a Geneva movement D, the driving element 4 of which is connected to a drive shaft 5 journaled in the frame C and driven by a worm and worm gear 6 through a countershaft 7 which has a belt and pulley connection 8 with the drive shaft of an electric motor 9 the circuit through which is controlled by a suitable switch 10.

Figures 12, 13, 14, 15, 23, 24, 25, 26, 27:
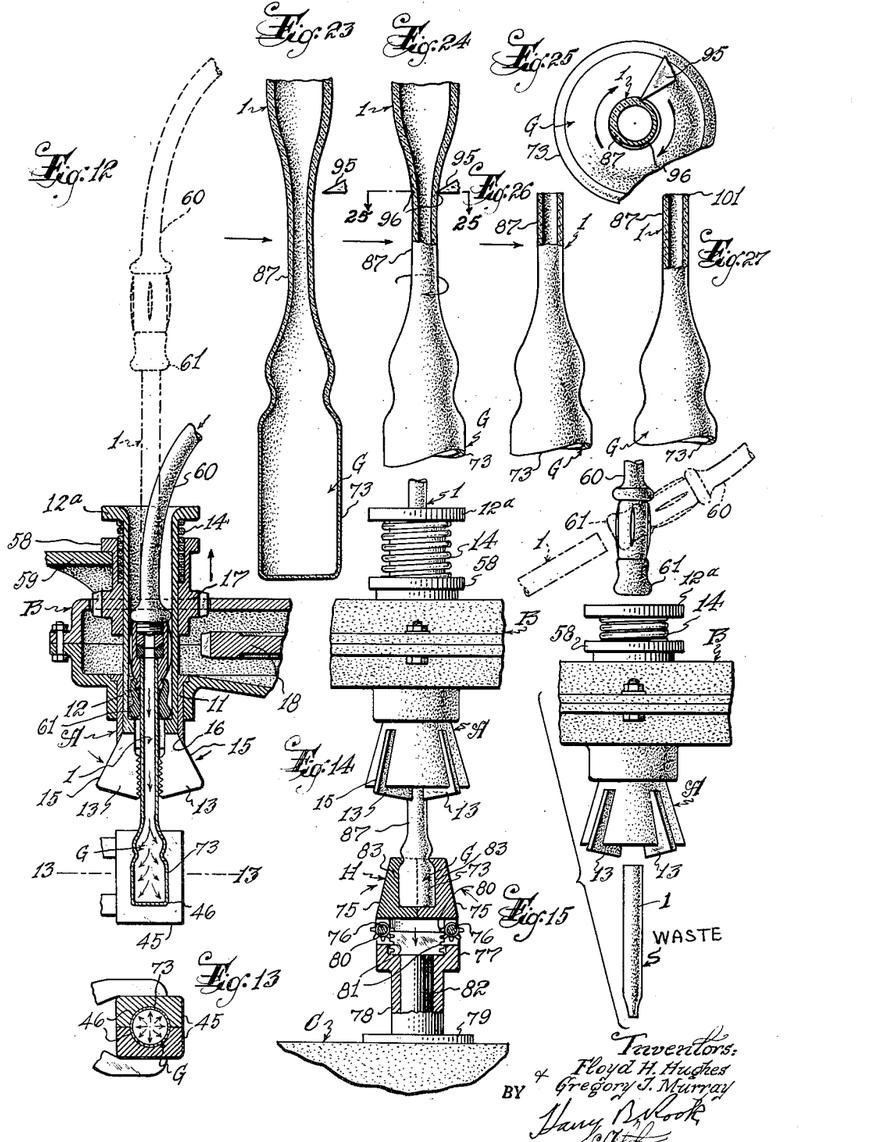
Figure 12 is a greatly enlarged vertical sectional view through one of the tube-holding chucks, approximately on the plane of the line 12—12 of Figure 1.
Figure 13 is a horizontal sectional view, on the plane of the line 13—13 of Figure 12.
Figure 14 is a greatly enlarged fragmentary side elevational view, from approximately the plane of the line 14—14 of Figure 1, with portions broken away and shown in section.
Figure 15 is a fragmentary side elevational view of one of the tube-holding chucks, showing the manner of releasing the glass tube therefrom.
Figure 23 is a greatly enlarged vertical sectional view through a finished ampule before its severance from the end of the tube stock.
Figure 24 is a composite side elevational and sectional view, showing the manner of scoring the neck of the ampule.
Figure 25 is a horizontal sectional view, approximately on the plane of the line 25—25 of Figure 24.
Figure 26 is a view similar to Figure 24, showing the ampule severed from the tube stock.
Figure 27 is a similar view, showing the mouth of the ampule glazed.

The chucks A are substantially identical with each other, and as shown in Figures 12 and 14, each comprises a support tube 11 rigidly connected to the underside of the turret B and having longitudinally slidably mounted therein a chuck-actuating tube 12 at the lower end of which are jaws 13 that are normally inherently resiliently moved apart and are forced toward each other to grip a tube between them by upward movement of the actuating tube 12 under the influence of a spring 14 so as to draw the outer beveled surfaces 15 of the jaws into engagement with a correspondingly tapered inner surface 16 at the lower end of the support tube 11. Longitudinally slidably but non-rotatably mounted on the actuating tube 12 is a pinion 17 that normally meshes with a large gear 18 that is fixedly mounted on a vertical tubular shaft 19 within the shaft 2 and surrounding a pipe 20 that has one end connected to a bottom plate on the frame C. The shaft 19 is driven by beveled gearing 21 from the drive shaft 7.

With this construction, normally the pinions 17 mesh with the gear 18 and when the motor 9 is running, the turntable B is rotated step by step by the Geneva movement D to bring each tube holder A through a predetermined path successively to a plurality of stations where said movement of the holder is momentarily stopped; and the glass tubes are rotated at all of the stations except the tube feeding station and the molding station.

Figure 6:
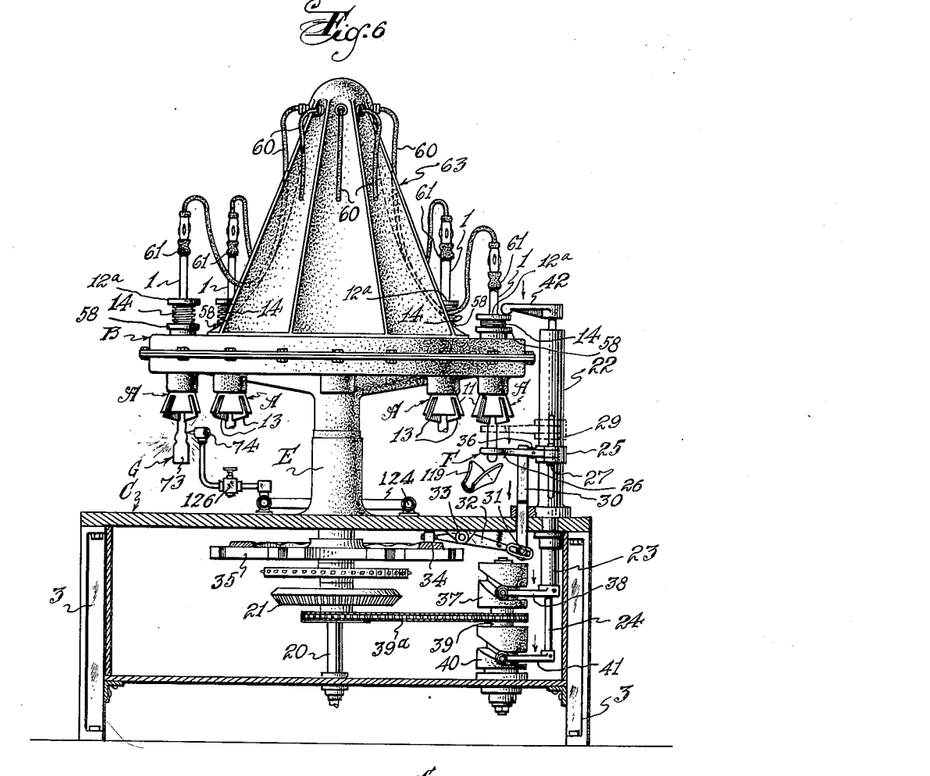
Figure 6 is a side elevational view, approximately from the plane of the line 6—6 of Figure 1, with portions omitted and other portions broken away and shown in section.
Figure 16:
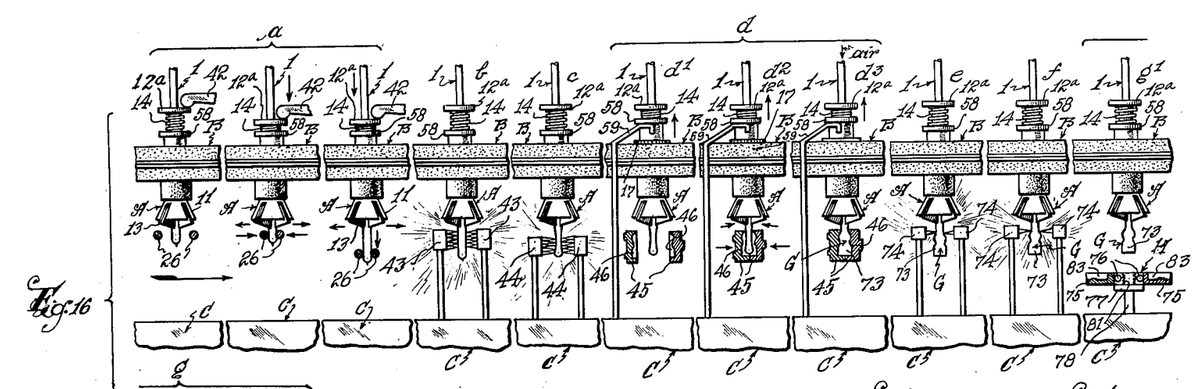
Figure 16 is a composite of fragmentary schematic side elevational views, illustrating the successive steps in the operation of the machine during the formation of an ampule.
Figures 16, 17, 18, 19, 20:
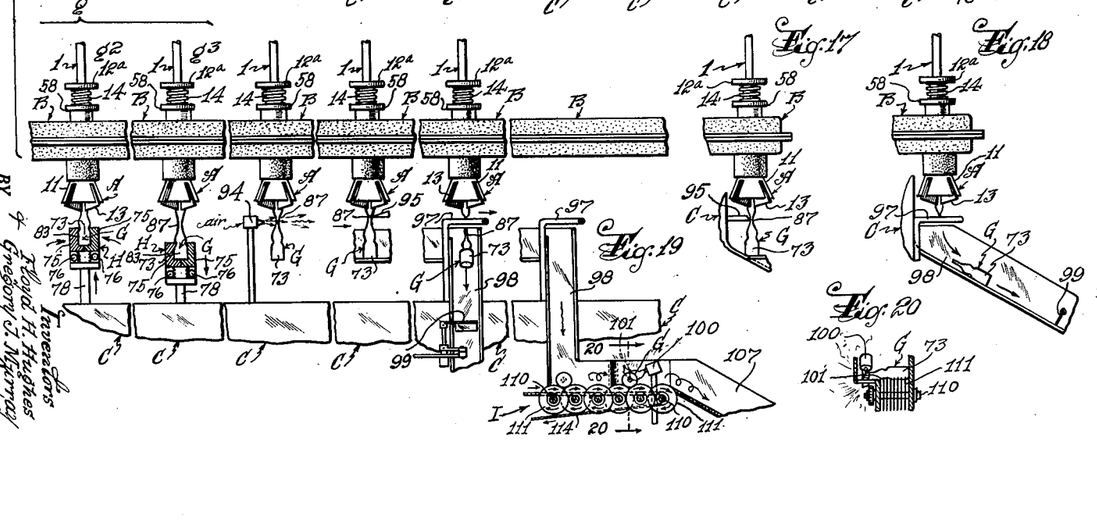
Figure 17 is a fragmentary schematic side elevational view of one of the tube-holding chucks and the tube-scoring device.
Figure 18 is a similar view, showing the device for breaking an ampule from the tube.
Figure 19 is a view showing the delivery chute for the ampule in side elevation and the glazing mechanism in vertical section, approximately on the plane of the line 19—19 of Figure 4.
Figure 20 is a transverse sectional view, approximately on the plane of the line 20—20 of Figure 19.

These stations are designated respectively, a, b, c, d, e, f, g and h, and are schematically shown in Figure 16 in the proper sequence. At station a is provided on the frame C a tube-feeding mechanism F which comprises a tubular standard 22 mounted on the top of the frame and having slidable therein a tubular shaft 23 in which is in turn slidable a rod 24. The tubular shaft 23 has a rigid connection with a collar or sleeve 25 that is slidable on the exterior of the pedestal and carries two opposed jaws 26 each of which is pivotally mounted at one end at 27 on the sleeve 25 while its other end is adapted to cooperate with the corresponding end of the other jaw to grip the glass tube 1 between them. As shown, the sleeve 25 is connected to the shaft 23 by pins 28 that extend through slots 29 in the standard 22. Disposed beneath the jaws 26 and adapted to enter a space between them, is an opening wedge 30 that has a pin and slot connection 31 with one end of a lever 32 that is pivotally mounted at 33 on the frame and has its other end following a face cam 34 on the top of the driven element 35 of the Geneva movement which is connected to the shaft 2. Normally, the sleeve 25 and jaws 26 are positioned closely beneath the lower ends of the tube holders A, as shown by broken lines in Figure 6, so as to grip the projecting end of the tube, the jaws being normally pulled toward each other to grip the tube by a tension spring 36, so that when the sleeve is pulled downwardly, the jaws will pull the tube downwardly, as shown by solid lines in Figure 6, and this action will continue until the opening wedge 30 is moved upwardly between the jaws to separate them and release the tube, as shown by broken lines in Figure 4.

The sleeve is moved upwardly and downwardly by a barrel cam 37 and a follower lever 38 that is connected to the tubular shaft 23, said barrel cam being mounted on a countershaft 39 journaled in the frame C and driven by a chain and sprocket connection 39a with the shaft 19 and also carrying a second barrel cam 40 which through a follower lever 41 reciprocates the rod 24. This rod 24 has a finger 42 at its upper end to engage the top flange 12a of the actuating tube 12 of the tube holder, so that as the rod 24 is pulled downwardly, said actuating tube is pushed downwardly to cause disengagement of the chuck jaws 13 from the tube and thereby release the tube for pulling or feeding by the jaws 26.

After the predetermined length of tube has been fed, the holder A moves to the next station with the chuck jaws 13 gripping the tube. At this second station b, the projecting portion of the tube is preliminarily heated by gas burners 43, and at the next station c the tube is moved between other gas burners 44 and is heated to the flowing molten state (see Figure 16).

At station d, the molten end portion of the tube is enclosed within a mold that comprises two complemental sections 45 that have recesses 46 to form a cavity of a size and shape corresponding to the body of the ampule to be formed. These mold sections are pivotally mounted at one end on a common pivot 47 on the top of the frame C, and each is pivotally connected to one end of one of a pair of links 48 whose other ends are pivotally connected by a common vertical pivot 49 to a yoke 50 which is pivotally connected by a horizontal pivot 51 to one end of a link 52, the other end of which is pivotally connected at 53 to one arm of a bell crank 54 which is pivotally connected at 55 on the frame C and has a follower roller 56 at its other end engaging a cam surface at one end of a cam 57 which is mounted on the countershaft 5. Normally, the mold sections are swung apart as shown at position $d^1$ in Figure 16, and in proper timed relation to the presentation of the molten tube at said station $d$, the bell crank 54 is actuated to swing the mold sections together, as shown at $d^2$ in Figure 16. Prior to the closing of the mold sections, the pinion 17 is disengaged from the gear 18 by the riding of a flange 58 on the pinion upwardly over a stationary cam surface 59 on the top of the frame C.

After the mold sections are closed, a jet of air is forced through the tube 1 into the molten portion thereof, so as to expand the molten glass into contact with the walls of the mold cavity, as shown at $d^3$ and thereby cool and harden the softened portion. For this purpose, an air tube 60 has one end connected to the end of each glass tube 1 by a suitable air-tight swivel coupling 61, and its other end connected to a distributing head 62 which is carried by the superstructure 63 of the turret B and cooperates with a valve plate 64 slidably connected to the tubular shaft 19 and normally pressed into snug contact with the distributing head by a spring 65. The distributing head has a port 66 to register at the proper time with a duct 67 in the valve plate 64 which communicates with the interior of the central pipe 20. Air is supplied to the central pipe by a pipe 68 that is controlled by a reciprocating spring-closed valve 69 which is opened at a predetermined proper time by a lever 70 pivoted intermediate its ends at 71 on the frame and engaging at its other end a cam 72 mounted on the countershaft 5. With this construction, when the mold jaws 45 are closed on one of the glass tubes 1, the port 66 for said tube 1 registers with the duct 67 and the valve 69 is opened to cause a jet of air to be forced into the molten section of the glass tube and force it into contact with the walls of the mold cavity to thereby complete the body 73 of the ampule G.

Thereupon, the bell crank 54 is actuated to open the mold jaws and the glass tube is moved to the next station $e$ where the portion of the tube above the body 73 is heated by burners 74 preparatory to forming the neck of the ampule. This heating is continued at station $f$.

Figure 9:
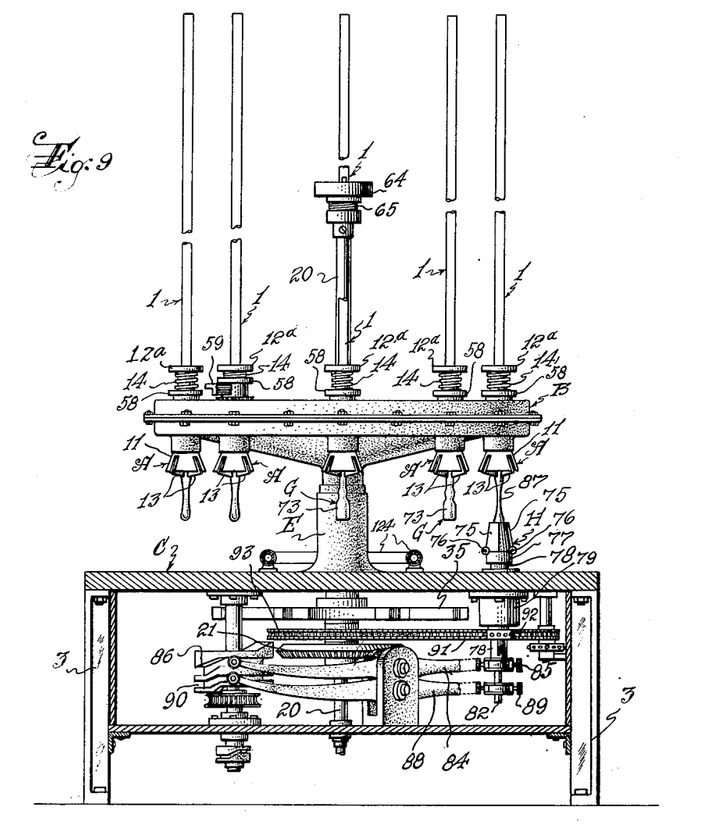
Figure 9 is a side elevational view, approximately from the plane of the line 9—9 of Figure 5, with portions omitted and other portions broken away and shown in section.
Figures 10, 11:
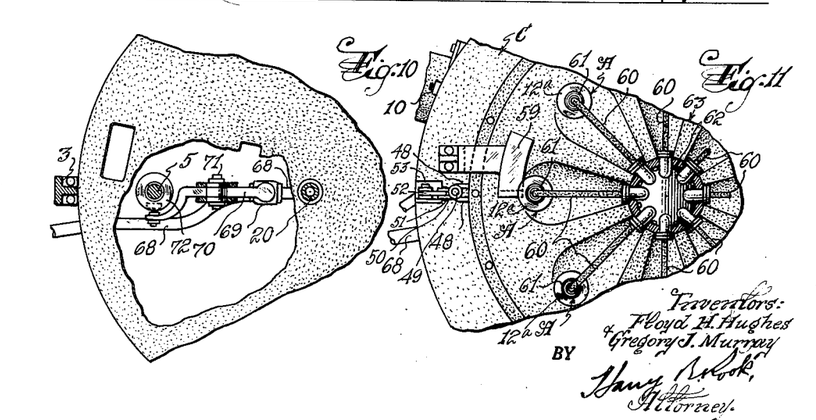
Figure 10 is a fragmentary sectional view, approximately on the plane of the line 10—10 of Figure 2.
Figure 11 is a composite top plan and horizontal sectional view, approximately on the plane of the line 11—11 of Figure 2, but illustrating a slight modification of the machine.

Then, at station $g$, the glass tube is stretched by a stretching mechanism H to form the neck of the tube. This stretching mechanism is shown as comprising two complemental jaws 75 each of which is pivotally mounted at one end at 76 upon a head 77 which is carried by a vertical shaft 78 reciprocable in a bearing 79 in the frame C. Each jaw has a segmental or mutilated pinion 80 connected thereto which meshes with a rack 81 carried by a rod 82 reciprocable in the tubular shaft 78 so that as the rod is pulled downwardly and pushed upwardly, the jaws will be moved together and apart, respectively. The jaws are formed with recesses 83 which, when the jaws are closed, form a cavity accurately corresponding in size and shape to the body 73 of the ampule, and while the jaws are in their open position, as shown at $g^1$ in Figure 16, the tubular shaft 78 is actuated upwardly by a lever 84 one end of which has a relatively rotatable connection 85 with said shaft while its other end follows a cam groove 86 in the cam 57 that is carried by the countershaft 5; whereupon the rod 82 is pulled downwardly to close the jaws around the body of the ampule, as shown in Figures 9 and 14 and at $g^2$ in Figure 16, then the head 77 is pulled downwardly by the lever 84, as shown in Figure 9 and at $g^3$ in Figure 16, so as to stretch the molten tube and form a reduced portion 87 for the production of the neck of the ampule.

The rod 82 is actuated by mechanism similar to that which actuates the head 77, or, as shown, by a lever 88 which has a relatively rotatable connection 89 with the rod 82 and is actuated by a cam groove 90 in the cam 57.

The glass tube and stretching mechanism H are both rotated at the same speed during this operation, and this is effected by the pinion 17 of the corresponding holder A meshing with the gear 18, which rotates the glass tube, and by rotation of the head 77 by a chain connection 91 between a sprocket 92 on the shaft 78 and a sprocket 93 on and movable with the shaft 19.

From station $g$ the tube is moved to station $h$ where the heated reduced portion 87 is subjected to a cold jet of air by a nozzle 94 connected to the pipe 68 to chill the glass, and then upon movement of the tube from station $h$ to the starting station $a$, the chilled tube passes a scoring blade 95 and due to rotation of the tube, a circumferential score 96 (see Figure 25) is formed in the reduced portion 87. On further movement in the same direction, the tube strikes a knock-off arm 97 which breaks the completed ampule G from the glass tube, and the ampule falls by gravity into a delivery chute 98 where it is stopped momentarily by a gate 99 and thereafter released onto a conveyor I of a glazing mechanism, said conveyor carrying the ampule so as to cause its mouth to pass through a gas flame from a nozzle 100 to glaze the mouth of the tube, as indicated at 101 (see Figure 27). The gate 99 is controlled by an ampule as it passes from the glazing mechanism, and, as shown, the ampule strikes a spring contact 102 and causes it to engage a relatively fixed contact 103 to close a circuit through an electromagnet 104 whose armature is pivotally connected to a lever 105 upon which the contacts 102 and 103 are mounted, and which itself is pivotally mounted at 106 on a portion of the frame of the machine, for example, on the side of a chute 107 through which the ampules are discharged into a suitable receptacle. When the electromagnet 104 is energized, it swings both of the contacts 102 and 103 out of the path of the ampule, and at the same time, through a link 108 and an arm 109 on the gate 99, actuates the latter out of the path of the ampule lying in the delivery chute 98.

Figures 1, 21, 22:
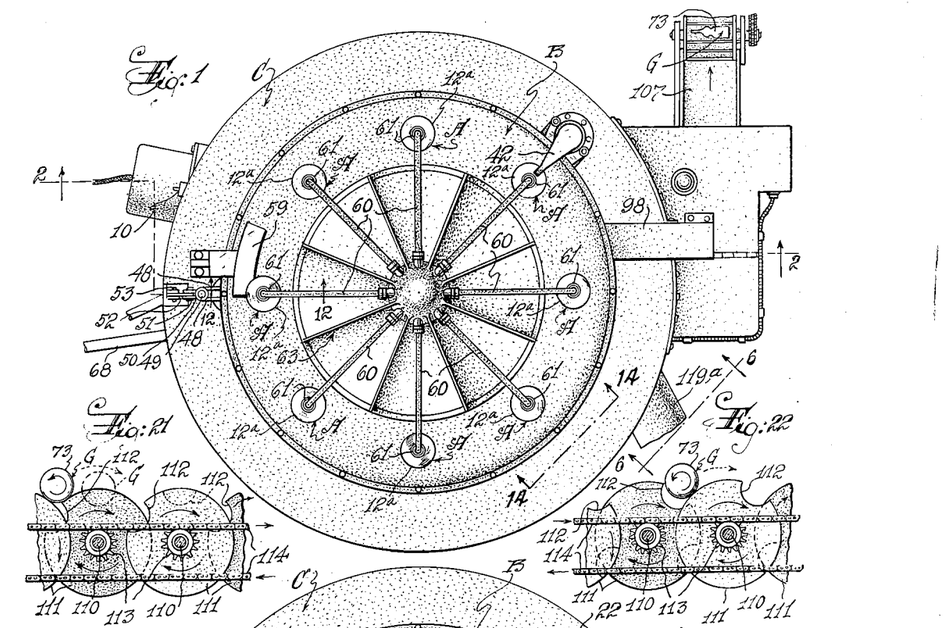
Figure 1 is a schematic top plan view of a machine embodying our invention.
Figures 21 and 22 are greatly enlarged fragmentary vertical sectional views similar to Figure 19, showing the details of construction and operation of the transfer mechanism for conveying the ampules from the delivery chute to the glazing flame.
Figure 2:
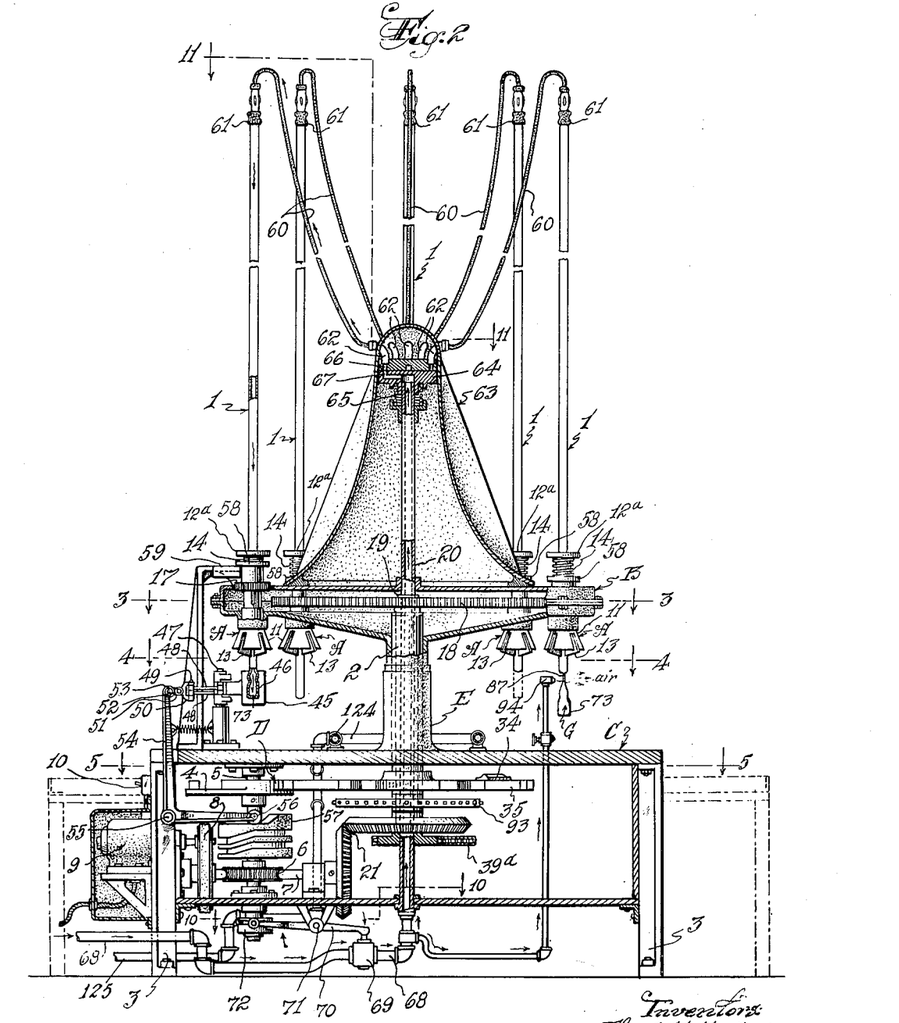
Figure 2 is a vertical sectional view, approximately on the plane of the line 2—2 of Figure 1.
Figure 3:
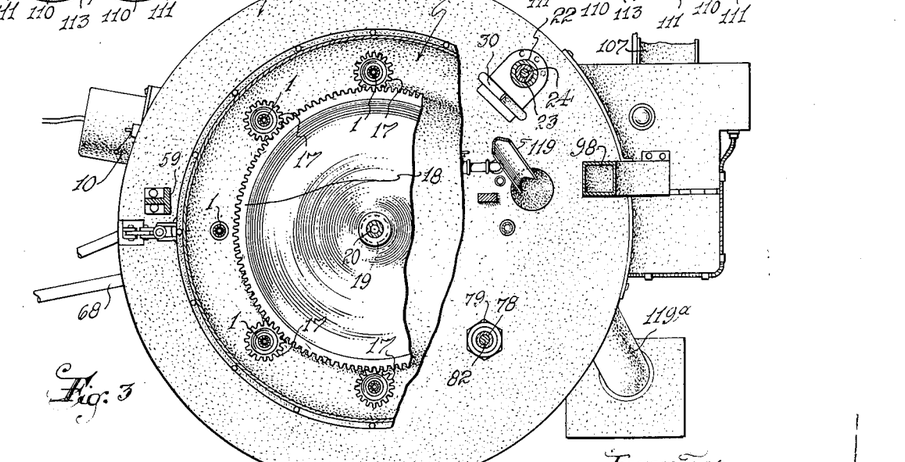
Figure 3 is a horizontal sectional view, approximately on the plane of the line 3—3 of Figure 2, with portions broken away.
Figure 4:
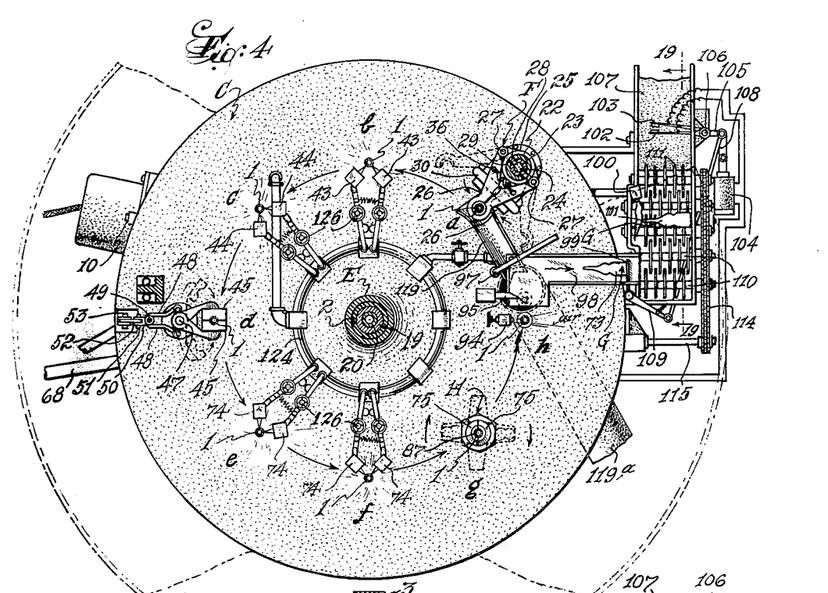
Figures 4 and 5 are horizontal sectional views, approximately on the planes of the lines 4—4 and 5—5, respectively, of Figure 2.
Figure 5:
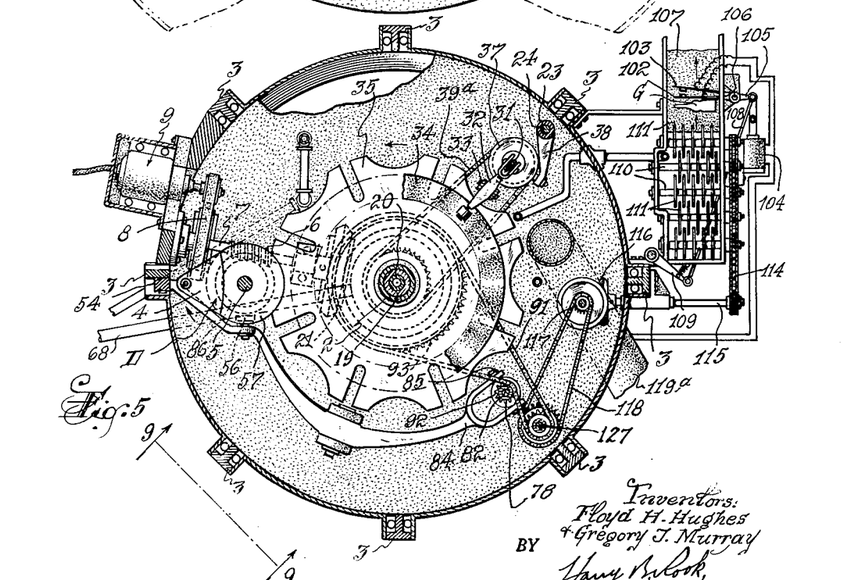

The conveyor I may be of any suitable construction, but preferably comprises a plurality of parallel shafts 110 each of which has a plurality of circular disks 111 spaced longitudinally thereof with their marginal portions interposed between the marginal portions of the disks on the next adjacent shafts, as best shown in Figures 4 and 5. The disks have notches 112 of a size to nicely receive an ampule, and the disks are synchronously driven by pinions 113 on the shafts 110 meshing with a chain 114 which is in turn driven by a sprocket on a shaft 115 that is driven by beveled gearing 116 from a countershaft 117 which has a chain and sprocket connection 118 with a shaft 127 driven by the chain 91. In operation, the ampule that falls by gravity from the delivery chute 98 is picked up by the alined grooves 112 in the disks on one of the shafts and conveyed to the notches in the disks on the next adjacent shaft, as shown in Figures 21 and 22. Each ampule lies momentarily in contact with and is frictionally rotated by the unnotched portions of the disks of adjacent shafts, and the ampules thus are moved in equidistantly spaced relation and each momentarily is rotated with its mouth in the glazing flame.

After the breaking off of each ampule from the tube, the latter continues its movement to the starting station a where another length of tubing for an ampule is fed by the jaws 26, whereupon the operations above described are repeated.

Each glass tube 1 is fed for the successive ampule until it is substantially exhausted, and then the section of the tube remaining in the chuck is released and the air tube 60 is disconnected so that said tube section may fall by gravity from the chuck, whereupon a new tube may be inserted into the chuck.

Figure 7:
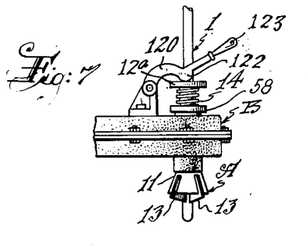
Figure 7 is a fragmentary side elevational view of a modification of the opening means for the glass-tube holding chucks shown in Figure 6.
Figure 8:
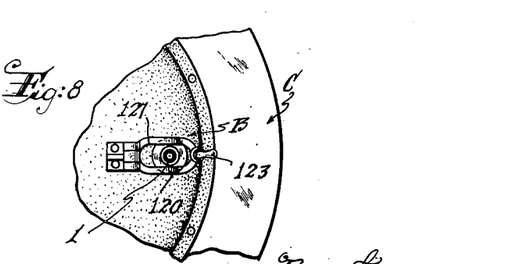
Figure 8 is a top plan view of the parts shown in Figure 7.

This operation is automatically performed at the starting station by the fingers 42, but it may be desirable to have convenient means for manually releasing the chucks for adjusting the tubes in the chucks as may be required. As shown in Figures 7 and 8, a small hand lever 120 has one end pivotally mounted on the top of the turret B and is formed with a longitudinal slot 121 through which the tube 1 extends, the lower side of the lever having small protuberances 122 to bear on the flange on the chuck-actuating tube 12, so that by applying downward pressure to the outer end 123 of the lever, the actuating tube can be easily depressed to release the chuck jaws 13.

Any suitable means may be provided for supplying gas to the burners 43, 44, 74 and 190, but conveniently a manifold pipe 124 may be arranged on the top of the frame concentric with the pedestal E, connected to a supply pipe 125 and having branches leading to the respective burners. It is also desirable that each burner be controllable by a valve 126 whereby the size of the flames and the intensity of the heat may be accurately regulated; and as shown, the burners of each pair are so related as to direct their flames against the glass tube.

From the foregoing, it will be seen that with our method and machine, a complete ampule having the rim of its mouth glazed, can be produced in one continuous operation without any special care or manual manipulation of the machine from the beginning of the operation to the end. Also, all of the glass forming the ampule passes through a molten state, so that the possibility of the presence of loose particles of glass in the completed ampule is reduced to the minimum. Furthermore, the molding of the body of the ampule ensures uniformity of all of the physical dimensions of the bodies of the ampules that are produced on the machine.

Preferably, a discharge system is provided to carry off the waste ends or stubs of the glass tubes, and as shown, a chute 119 is disposed beneath the feeding jaws 26 for directing the glass tube stubs into a discharge pipe 119a.

While we have shown and described the invention as embodied in certain details of construction, it should be understood that this is primarily for the purpose of illustrating the principles of the invention, and that many modifications and changes may be made in the details of construction of the machine and in the steps of the method within the spirit and scope of the invention.

Having thus described the invention, what we claim is:

1. A machine for making glass vessels from a glass tube including a holder for a glass tube, means for intermittently moving said holder through and momentarily stopping it at each of a plurality of operating stations with one end portion of the tube exposed, means for feeding a predetermined length of tube from said holder at one station, means at another station for heating the exposed end portion of said tube, means at the next station for molding said heated portion to form the body of the vessel, means at another station for heating a zone of said tube above and adjacent said body, means for stretching said heated zone at another station to form a constricted neck, means at a subsequent station for cooling said constricted neck, means for breaking said cooled portion to separate the vessel from the tube, and means for glazing the broken end of the portion of said constricted neck that is connected to said body.

2. The machine as defined in claim 1, with the addition of means for conducting said separated vessel by gravitational action from said breaking means to said glazing means.

3. The machine as defined in claim 2, wherein said glazing means includes a gas flame and a conveyor for moving and momentarily holding said vessels with said broken ends in contact with said flame.

4. The method of producing a vessel having a body and a constricted neck at one end thereof, which consists in holding a glass tube in vertical position, heating to soften the wall of said glass tube at and a substantial distance above the lower end of the tube, and while maintaining the wall of the tube above said softened portion at substantially the original thickness, molding said softened portion of said wall to form the bottom and side wall of the body of the vessel and thereby cooling and hardening said softened portion, thereafter heating to soften the wall of said glass tube in a zone continuing upwardly from the upper end of said molded portion, and then stretching said heated zone longitudinally to reduce the thickness of said wall and the cross-sectional area of said tube at said zone and form a constricted neck on said body, all portions of the vessel thereby passing through a molten state during the production of the vessel.

5. The method of producing a vessel having a body and a constricted neck at one end thereof, which consists in holding a tube in vertical position, heating to soften the side wall of said glass tube at and a substantial distance above the lower end of said tube and while maintaining the wall of said tube above said softened portion at substantially the original thickness, enclosing said softened portion in a cavity mold, injecting fluid under pressure into the other end of said tube to force said softened portion into contact with the walls of said mold to simultaneously mold the bottom and side walls of the body of the vessel and simultaneously cool and harden said softened portion, removing said body from the mold and then heating to soften the zone of the tube immediately above said molded portion, stretching said softened zone longitudinally to reduce the cross-sectional area thereof and to thin the walls of the tube at said zone, and severing the wall of the tube intermediate the ends of said reduced zone to separate the vessel from said tube, all portions of the vessel thereby passing through a molten state during the production of the vessel.

6. The method as defined in claim 5, wherein the step of severing said reduced zone consists in scoring and breaking the tube at said reduced zone, and with the additional step of heating and softening the broken extremity of the tube wall at said reduced zone to smooth the surface thereof.

7. A machine for making from glass tubes ampules having bodies and reduced necks, comprising a frame, a tube holder for supporting a glass tube with one end portion depending from the holder, heating means on said frame for softening the side walls of the tube from the lower end thereof upwardly a substantial distance, a mold for enclosing the softened end portion of the tube and having a cavity whose walls correspond in shape and size to the ampules, means for injecting air into the other end of said tube while said softened portion is within the mold to force said softened portion into snug contact with the walls of the mold cavity to form said bottom and side walls of said body, heating means on said frame to soften the wall of said tube in a zone continuing upwardly from the upper end of said molded body, means on said frame and cooperative with said holder for stretching said softened zone longitudinally to form a reduced portion the wall of which is substantially less in thickness than the original thickness of the tube wall, and means for moving said tube holder to convey said depending end of the tube from the first-mentioned heating means to said mold, thence to the second-mentioned heating means and thereafter to said means cooperating with the holder for stretching the tube, all portions of the ampule thereby passing through a molten state during the production of the ampule.

8. A machine for making glass vessels from glass tubes including a frame, a tube-holder for supporting a glass tube in vertical position, means for intermittently moving said holder through and normally stopping it at each of a plurality of operating stations with the lower end of the tube exposed, means on said frame for feeding a predetermined length of tube from said holder at one station, heating means on said frame at another station to soften the exposed portion of the tube from the lower end thereof a substantial distance upwardly, means at the next station for molding said softened portion to form simultaneously the bottom end and side walls of the body of the vessel, heating means on said frame at a subsequent station for softening the wall of said tube in a zone continuing upwardly from said molded body, and means for thereafter stretching the wall of the tube in said softened zone to reduce the cross-sectional area of the tube, all portions of the vessel thereby passing through a molten state during the production of the vessel.

9. A machine as defined in claim 7 with the addition of means on said frame for scoring and breaking the wall of the tube at said reduced portion after cooling of said portion, thereby to separate the ampule from the tube.

FLOYD H. HUGHES.
GREGORY J. MURRAY.

REFERENCES CITED

The following references are of record in the file of this patent:

UNITED STATES PATENTS

| Number | Name | Date |
|---|---|---|
| 1,330,707 | Hoffstetter et al. | Feb. 10, 1920 |
| 1,342,821 | Leiman | June 8, 1920 |
| 1,522,271 | Rippl | Jan. 6, 1925 |
| 1,532,077 | Quackenbush et al. | Mar. 31, 1925 |
| 1,674,997 | Schmunk | June 26, 1928 |
| 2,101,213 | Dichter | Dec. 7, 1937 |
| 2,235,515 | Carpenter | Mar. 18, 1941 |
| 2,258,408 | Cozzoli | Oct. 7, 1941 |

FOREIGN PATENTS

| Number | Country | Date |
|---|---|---|
| 282,057 | Great Britain | Mar. 22, 1928 |